Jan. 24, 1939.  W. H. CHURCHILL  2,144,910
MOUNTING BRACKET AND INSTALLATION THEREOF
Filed Nov. 7, 1936
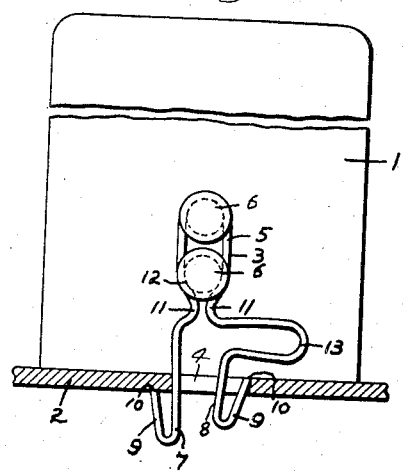
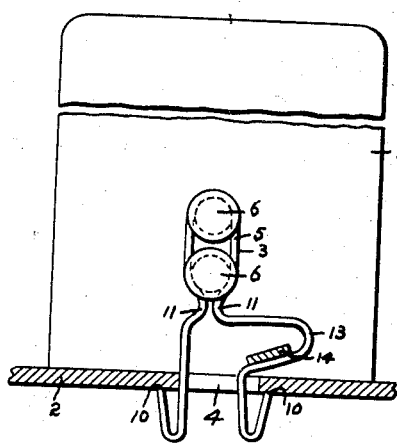
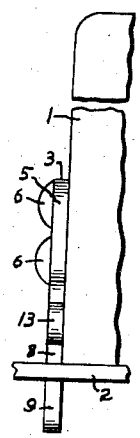
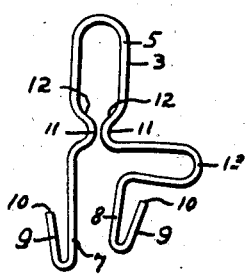
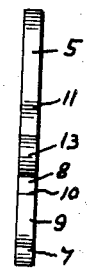
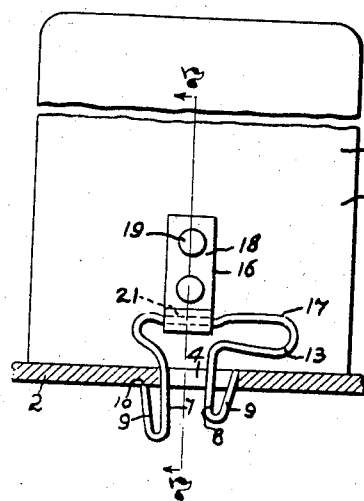
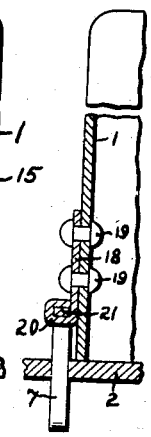
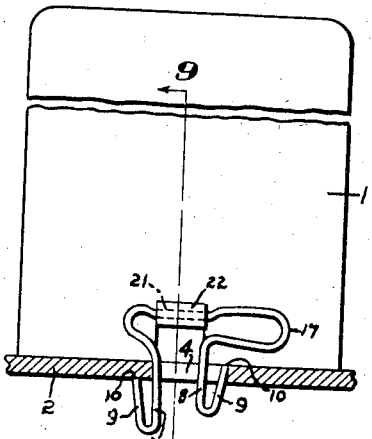
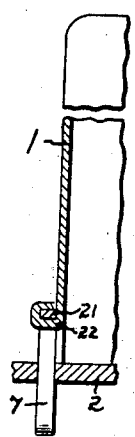
Inventor:
Wilmer H. Churchill.
by Walter L. ...
Att'y.

Patented Jan. 24, 1939

2,144,910

UNITED STATES PATENT OFFICE 2,144,910

MOUNTING BRACKET AND INSTALLATION THEREOF

Wilmer H. Churchill, Saugus, Mass., assignor to United-Carr Fastener Corporation, Cambridge, Mass., a corporation of Massachusetts Application November 7, 1936, Serial No. 109,743

3 Claims. (Cl. 24—213)

My invention aims to provide improvements in bracket members such as are used for securing electrical units to a support and the installations of the same.

Referring to the drawing, which illustrates preferred embodiments of my invention:—

Figure 1 is a side view of an electrical installation showing a shield can or a condenser, coil or like part such as used in a radio set and an improved bracket member for securing the part to a support with my bracket member in the act of being moved into attaching position;

Fig. 2 is a view similar to that shown in Fig. 1 showing my bracket member in final attachment to a support with a portion of the tool used for moving my bracket member into attaching position being shown in cross-section;

Fig. 3 is a fragmentary side view of the installation shown in Fig. 2;

Fig. 4 is a front view of the bracket member shown in Figs. 1-3;

Fig. 5 is a side view of the bracket member shown in Fig. 4;

Fig. 6 is a plan view of a second form of electrical installation;

Fig. 7 is a section taken on the line 7—7 of Fig. 6;

Fig. 8 is a plan view of a third form of electrical installation; and

Fig. 9 is a section taken on the line 9—9 of Fig. 8.

Referring to the embodiment of my invention illustrated by Figs. 1 through 5 inclusive, I have shown a mounting means for an electrical unit such as the electrical device 1 which may be a coil, condenser or similar structure. The electrical device which I have chosen to illustrate my invention comprises a container 1 detachably secured to a support 2 by means of my improved mounting brackets 3. One end of each of my improved mounting brackets 3 is shaped and arranged for rigid attachment to the unit 1 while the other end of the bracket 3 is shown in fastening engagement with the material surrounding an aperture 4 disposed in the support 2 (Fig. 2). It will be noticed that the bracket 3 has a pair of arms extending through the aperture 4 when the bracket is in final attachment with the support with one of the arms in spring contact wtih the material of the support 2 surrounding the aperture 4 but adapted to be moved when desired so as to permit removal of the bracket 3 from the support in a manner which will be described.

Referring specifically to the form of mounting bracket illustrated in Figs. 4 and 5, I have provided a one-piece bracket member formed by bending a strip of ribbon-like metal between its ends. I do not wish, however, to be limited to the particular form of material illustrated and described because it is apparent that my bracket member could be made satisfactorily from other material such as wire. The bracket 3 has an attaching portion in the form of a loop portion 5 at one end adapted for fastening engagement with headed projections 6, which may be rivets or the like, extending beyond the body portion of the container 1. The loop 5 has an elongated shape in my preferred form thereby cooperating with a pair of projections 6 for preventing rotation of the bracket 3 relative to the container 1. The other end of the bracket 3 provides a pair of leg portions 7 and 8 having, in my preferred form, hook portions 9—9 at each of their free ends. Each of the hook portions 9—9 presents a shoulder 10 at its outermost free end substantially facing the attaching loop portion 5. The free ends of the loop portion 5 converge at points 11—11 forming shoulders 12—12 on the opposite side of the converging portions 11—11 from the legs 7 and 8 (Fig. 4). When secured to the container 1, the loop 5 has portions disposed between the heads of the projections 6—6 and the wall of the container 1 with the shoulders 12—12 of the loop engaging the lowermost of the projections 6 for preventing ready detachment of the bracket 3 from the container. The leg 7 in my preferred form is relatively straight for the greater part of its length and formed as a continuation of one side of the loop portion 5. The material of the leg 8 adjacent the loop portion 5 extends outwardly away from the leg 7 and then back upon itself forming a reverse-bend portion 13 in the leg 8 intermediate the loop 5 and a relatively straight portion of the leg 8, which last-mentioned portion is located adjacent the respective hook portion 9. Normally the hook portion 9 of the leg 8 is disposed nearer to the attaching loop 5 than the hook portion 9 of the leg 7 with the result that the hook portion 9 of the leg 8 must be forced down against the spring tension of the reverse-bend portion 13 for enabling the shoulder 10 of the last-mentioned leg to engage the support 2 when the bracket 3 is in final attachment to the support 2, as will be hereinafter described.

In assembling the parts of my preferred form of installation, the loop 5 of the bracket 3 is forced beneath the heads of the projection 6 so that the shoulders 12—12 engage opposed lower surfaces of the lower of the projections 6 thereby holding the bracket 3 in secure attachment to the container 1. The container 1 is then moved toward the support 2 so that the hook portion 9 of the leg 7 is disposed beneath the lower surface of the support 2 and the shoulder portion 10 of the leg 8 is disposed within the aperture 4, as most clearly shown in Fig. 1. The shoulder 9 of the leg 8 is then moved into engagement with a lower surface of the support 2 through downward pressure exerted upon the lower side of the reverse-bend portion 13 by a tool means, such as a screw driver plate 14 (Fig. 2). As the shoulder 10 of the leg 8 is forced against the natural spring action set up in the reverse-bend portion 13, the shoulder 10 engages the lower surface of the support 2 in spring contact whereby the bracket 3 is in secure attachment to the support. If it is desired to disengage the bracket 3 from the support, force is exerted upon the hook portion 9 in the direction of the aperture 4 so as to move the hook portion out of engagement with the support 2 thereby enabling it to spring back into substantially the position shown in Fig. 1. The bracket 3 may now be readily removed from the support.

Referring now to the second form of my invention, as shown in Figs. 6 and 7, I have provided a container or the like unit 15, which is similar in form to that shown in Figs. 1–3, but instead of employing parts such as the projections 6 of the first form of my invention, in combination with the container for receiving an attaching portion of the fastener member, I have provided an attaching means 16 of different construction having a loop portion adapted to receive a portion of a modified form of bracket 17 for securing the bracket to the container. My modified form of attaching means 16 comprises a leg portion 18 having a relatively flat side adjacent a wall of a container 15 (Fig. 7) and secured to the same through means such as rivets 19 passing through apertures in the leg 18 and the container wall and headed over upon outer surfaces of the parts, as most clearly shown in Fig. 7. The lowermost free end of the leg 18 is curled outwardly and upwardly with its outermost free end portion substantially in engagement with the leg 18 (Fig. 7) thereby forming a relatively wide loop 20 adapted to receive a portion of my second form of bracket member 17 for securing the bracket to the container.

The bracket member 17 is similar to my first form as illustrated in Figs. 1–5, but instead of an attaching portion such as the loop 5 of my first form, I have provided a relatively straight attaching portion 21. The portion 21 unites the upper end of the leg 7 with that portion of the reverse-bend portion 13 of the leg 8 extending away from the leg 7. The portion 21 is disposed slightly beneath a straight line connecting the uppermost point of the leg 7 and the uppermost side of the reverse-bend 13 so as to prevent lateral movement of the bracket 3 relative to the attaching means 16. My bracket member 17 may be assembled with the attaching means 16 in any suitable manner such as by placing the attaching portion 21 within the loop 20, the top side of the loop being left open to receive the attaching portion and then bending the top side of the loop substantially adjacent the leg 18 so that the bracket member 17 is securely attached to the container. The bracket member 17 may now be attached to the support 2 exactly in the manner of the bracket 3 of my first form of installation as hereinbefore described.

The installation shown in Figs. 8 and 9 differs from the installation shown in Figs. 6 and 7 only by the fact that instead of employing a separate piece 16 as a means for providing a loop to receive the attaching portion 21 of the bracket member 17, I have formed a loop 22 integral with a wall of the container 1 by curling upwardly material of the wall of the container adjacent to the bottom edge of the container. The bracket member 17 may be secured to the loop 22 of the third form of my installation in a manner similar to that described in connection with the second form of installation as illustrated in Figs. 6 and 7.

By my invention I have provided efficiently working mounting brackets capable of easy assembly with the unit which they carry and capable of easy attachment to a support. As a result of the fact that my brackets are made by bending a strip of ribbon-like material between the ends a substantial saving is effected in the cost of manufacture over the cost of manufacturing brackets now in use made by blanking the body of the bracket out of sheet metal.

Although I have illustrated and described preferred embodiments of my invention, I do not wish to be limited thereby because the scope of my invention is best set forth in the following claims.

I claim:

1. A fastening bracket of the class described having an attaching portion whereby said fastening bracket is secured to a support, a pair of leg portions extending from said attaching portion and lying in substantially the same plane, each of said legs having a shoulder portion movable toward the other, and one shoulder being normally in a different plane from the other and one of said legs having a loop-shaped portion intermediate its shoulder portion and said attaching portion whereby said last-mentioned shoulder portion may be movable against the tension of said loop-shaped portion toward the plane of the shoulder on the other leg for the purpose described.

2. A fastening bracket of the class described having an attaching portion whereby said fastening bracket is secured to a support, a pair of leg portions extending from said attaching portion and lying in substantially the same plane, each of said legs having a hook portion at one end providing an upwardly facing free end portion for engagement with a part through which said legs may pass, and one of said legs having a bend intermediate its hook portion and said attaching portion whereby said last-mentioned hook portion is movable against the tension of said bent portion to elongate said leg whereby the free end portion of said last-mentioned hook portion may be moved relative to the free end portion of the hook portion of the other leg for the purpose described.

3. A fastening bracket of the class described formed from a single strip of ribbon-like metal bent between its ends and comprising a loop-shaped attaching portion, leg portions extending beneath said loop-shaped portion and each having a shoulder portion, and at least one of said legs having a loop-shaped yieldable portion intermediate its shoulder portion and said loop-shaped attaching portion whereby the shoulder portion of said last-mentioned leg is movable toward and away from said attaching portion.

WILMER H. CHURCHILL.